Aug. 29, 1961     L. W. HARVEY     2,997,882
BALANCING APPARATUS
Filed July 3, 1958     3 Sheets-Sheet 1
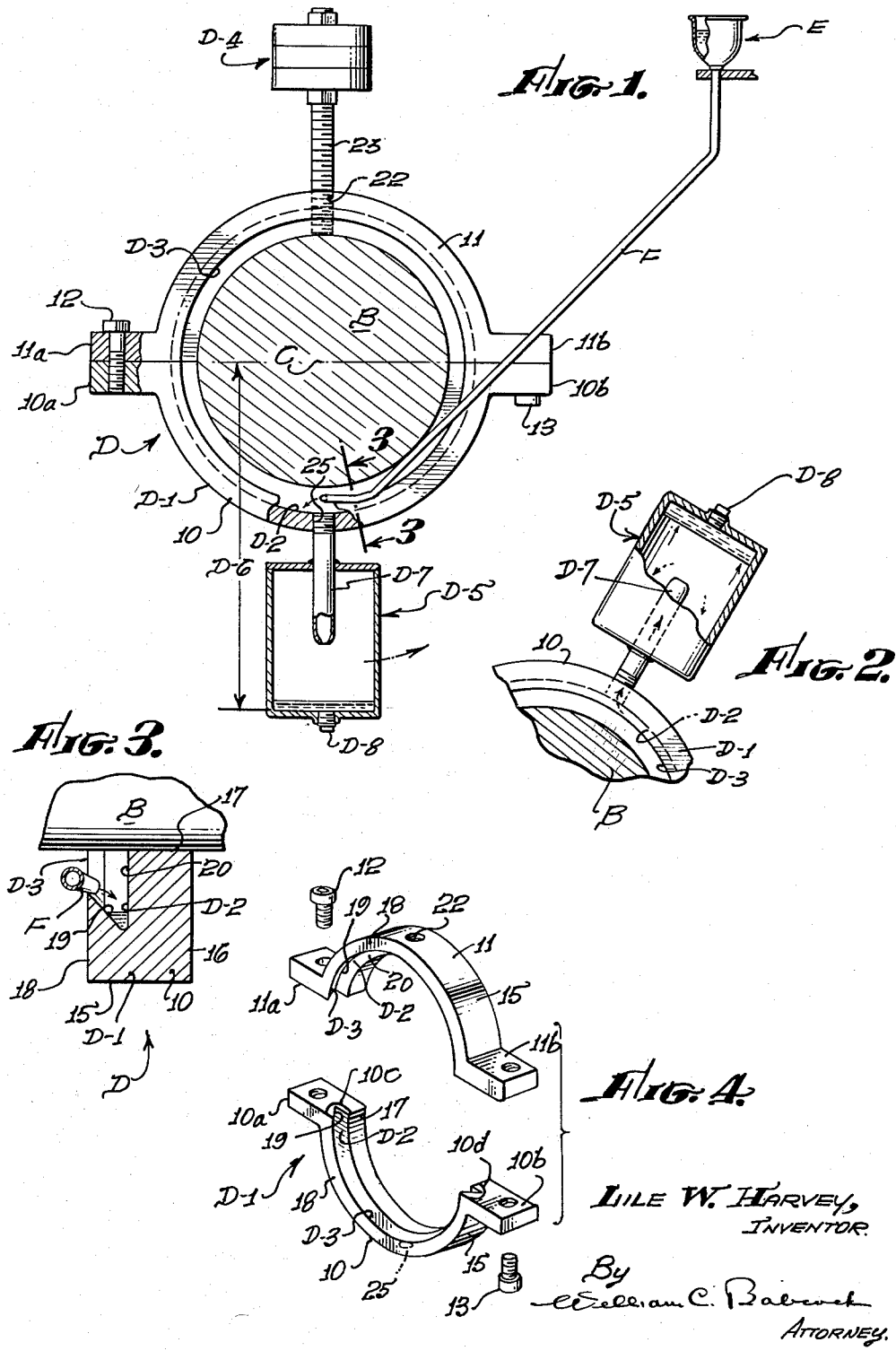
LILE W. HARVEY,
INVENTOR.
By
William C. Babcock
ATTORNEY.

Aug. 29, 1961   L. W. HARVEY   2,997,882
BALANCING APPARATUS
Filed July 3, 1958   3 Sheets-Sheet 2
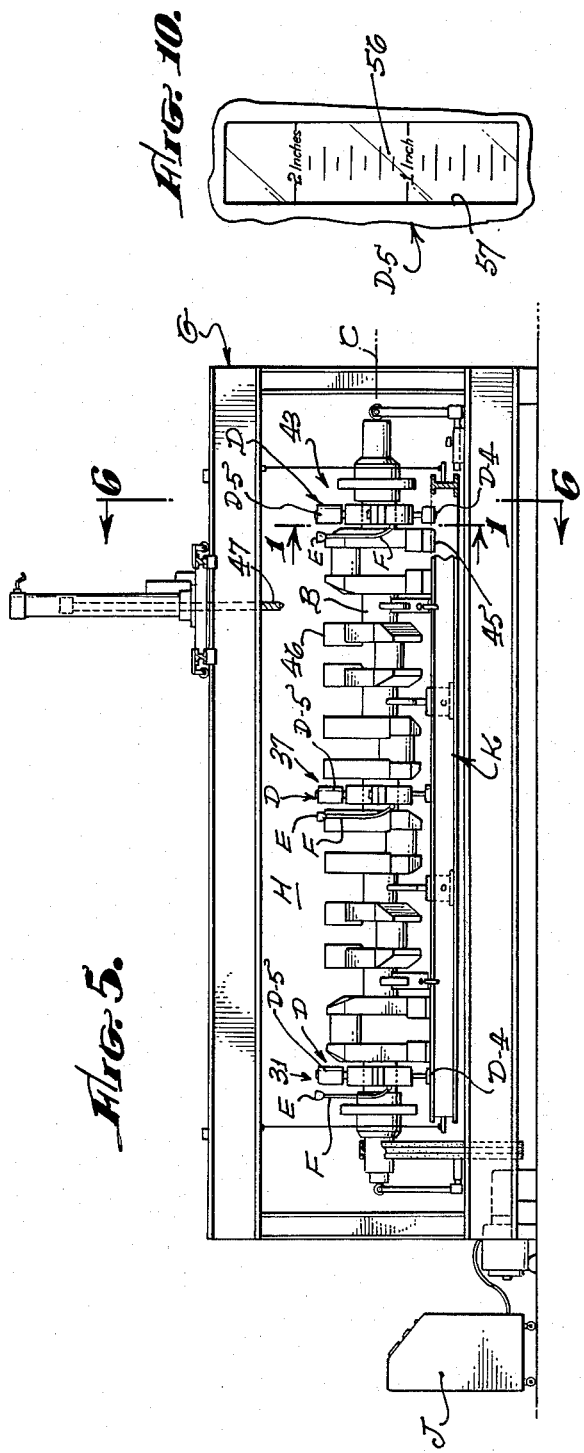
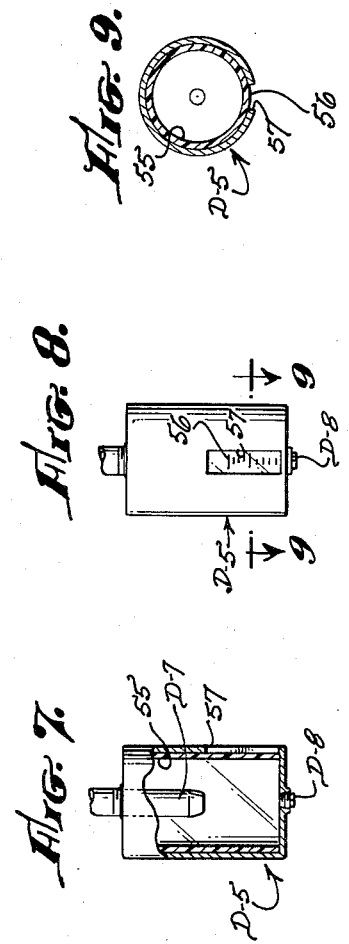
LILE W. HARVEY,
INVENTOR.
By William C. Babcock
ATTORNEY.

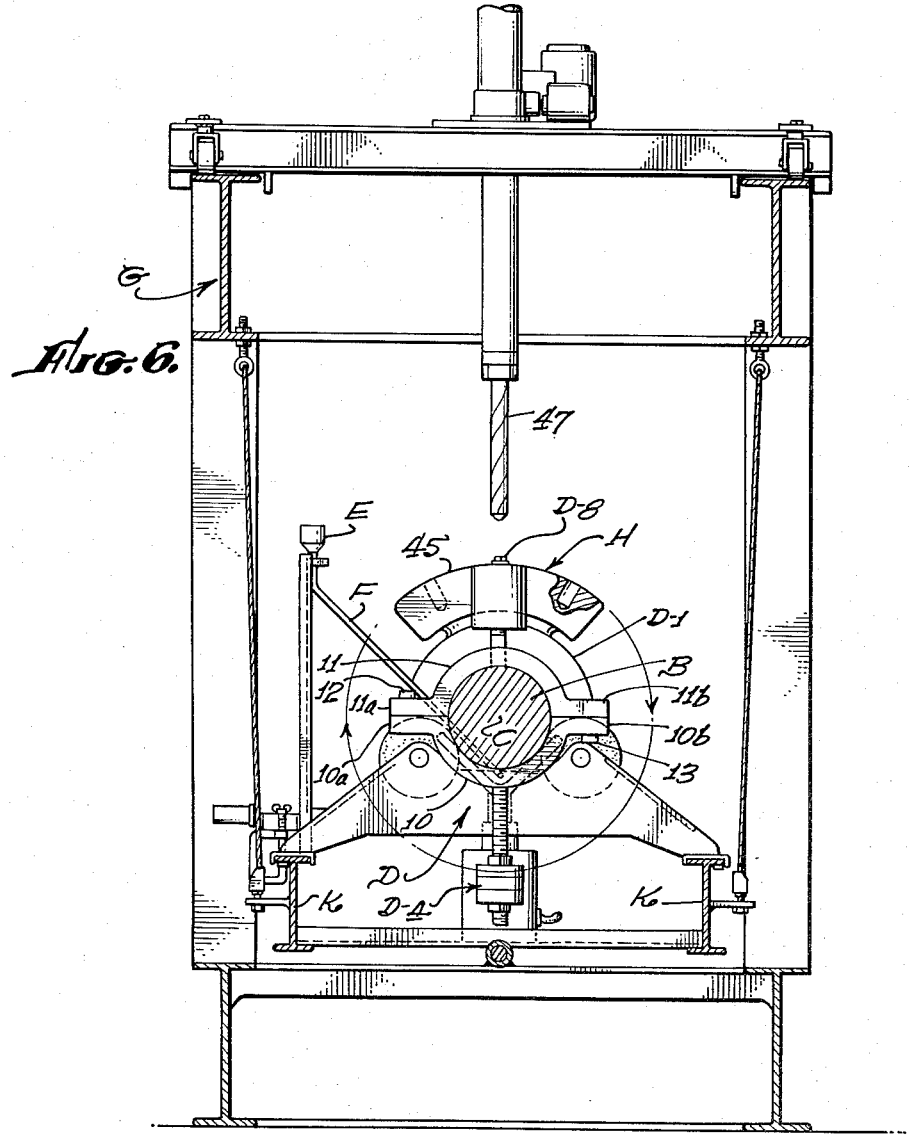

United States Patent Office 2,997,882
Patented Aug. 29, 1961

2,997,882
BALANCING APPARATUS
Lile W. Harvey, Los Angeles, Calif., assignor to Ernest V. Berry, Palos Verdes Estates, Calif.
Filed July 3, 1958, Ser. No. 746,375
7 Claims. (Cl. 73—468)

The present invention relates to apparatus for dynamic balancing, and more particularly to apparatus which is adapted for experimentally determining the magnitude of unbalance of a rotatable body in a particular angular position about the circumference of the body.

A basic operation generally encountered in dynamic balancing is that of balancing a rotatable body in a particular plane which is perpendicular to the axis of rotation of the body. Several variable factors must be considered. In each case the concentration of the unbalanced mass of the body will be found to lie in a particular angular position about the circumference of the body. The unbalance may be caused by a particular amount of excess mass positioned at a particular radius distance from the axis of rotation, but because of the rigid connection of the various portions of the body to each other it is usually proper to consider that the unbalance is caused by a smaller amount of excess mass at a larger radius distance, or by a larger amount of excess mass at a smaller radius distance. In any event the unbalance condition is corrected either by removing weight from the body on its heavy side or by adding weight on its light side, there being some choice as to the radius distance from the axis of rotation at which weight is added or removed.

Modern electronic equipment utilized in conjunction with a supporting cradle has greatly simplified the problem of precisely determining the angular position about the circumference of the body at which the unbalance mass concentration lies. Available equipment is also capable of precisely determining when an unbalance condition exists in the particular plane which is being observed, i.e., determining whether or not adequate correction or compensation has been made. Actual determination of the magnitude of the unbalance, and of the corresponding magnitude of the necessary correction (involving a particular weight at a particular radius distance) has heretofore presented very difficult problems. The difficulty appears to have been that the equipment for determining whether or not the unbalance exists is incapable of determining precisely the magnitude thereof—that is, the magnitude of oscillations produced by the unbalanced condition have not afforded a reliable criteria for determining the amount of weight compensation required.

It has therefore been the accepted practice to determine the necessary amount of weight compensation by a trial-and-error method. According to this method a compensating weight is affixed to the rotatable body which is then rotated and its oscillations observed to determine whether the weight should have been greater or smaller. After such an observation the rotation of the body is stopped, the magnitude of the weight is changed, and the body is again rotated in order to observe whether the compensation has been successful. In many applications of dynamic balancing this procedure has been tolerable, but where a very large and heavy body is being balanced the trial-and-error method is grossly inefficient because of the starting and stopping time which is required.

Although the present invention may be utilized just as effectively in numerous other applications of dynamic balancing, it has found its initial application in the dynamic balancing of large crankshafts such as are used in railroad locomotive diesel engines. The dynamic balancing of an elongated rotary body such as a diesel engine crankshaft may be accomplished in four major steps as follows. The first step is to select various points throughout the length of the rotary body at which dynamic balance must be obtained. As a practical matter, it is difficult to precisely determine the points where unbalance exists since all of the longitudinal portions of the rotary body are rigidly connected to each other. Unbalance existing at a particular point along the length of the body can be detected on either side of that point because of the rigid connecting structure. It is, therefore, sufficient in the case of a crankshaft to test for unbalance at several specified points throughout its length, and to make corrections or compensations at the same or other specified points accordingly.

When a particular point along the length of the body has been selected to be tested and compensated, the second step is to then determine the angular direction of unbalance within the selected test plane which is perpendicular to the axis of rotation of the body. The weight center may lie at any angle from zero degrees to three hundred sixty degrees with respect to a reference position about the circumference of the body.

Along with determining the angular direction of unbalance in a particular test plane along the length of the shaft it becomes necessary to perform a third step which is that of measuring the amount of unbalance. The fourth step is that of compensation, by adding or subtracting an appropriate amount of weight at the proper angular position and at the proper radius distance from the axis of rotation so as to correct the unbalance.

It is true that to some extent the four major steps of the balancing process as outlined above are inter-related and each one affects the other. The present invention is primarily concerned, however, with apparatus for performing the third step, namely, for measuring the magnitude of unbalance in a particular plane perpendicular to the axis of rotation of the body after the angular position thereof has previously been established.

One object of the invention, therefore, is to provide a balancing mechanism for precisely determining during a single test run the magnitude of compensating weight which is required to dynamically balance a rotary body.

Another object of the invention is to provide apparatus which may be removably attached to an unbalanced rotary body for accurately determining the amount of compensating weight which is required at a particular angular position about the circumference of the body and at a particular radius distance from its rotation axis in order to dynamically balance the body.

An additional object of the invention is to provide a balancing mechanism capable of readily determining the amount or degree of unbalance of a rotatable body in a particular plane which is perpendicular to the axis of rotation of the body, after the angular position of said unbalance about the circumference of the body within said plane has been determined.

A further object of the invention is to provide a balancing clamp having no moving parts and which may be conveniently attached to a rotatable body for concentric rotation therewith, in order to precisely determine during a single rotational test period the amount of compensating weight which is required at a particular position to achieve dynamic balance of the body.

According to the present invention an assembly is provided which is adapted to be removably clamped around a rotatable body in a substantially symmetrically disposed relation with respect to a plane which is perpendicular to the axis of rotation of the body. The assembly includes a normally empty container rigidly supported at a fixed radius distance from the axis of rotation of the body, the entire assembly including the empty container constituting a dynamically balanced integral unit. Means are provided for deriving a mobile substance from a source disassociated both from the rotatable body and from the assembly, and for controllably supplying the mobile substance to the container while the body and the removable assembly are rotating. Vibrations or other phenomena produced by dynamic unbalance of the body in the particular plane are measured and indicated by conventional means, the mobile substance being supplied in incremental quantities to the container under the control of the operator until dynamic balance is achieved.

The above and other objects of the invention will be more readily understood from the following description in conjunction with the accompanying drawing in which:

FIGURE 1 is an elevational view partially in cross section of the balancing mechanism in accordance with the invention;

FIGURE 2 is a fragmentary view partially in cross section of the mechanism of FIGURE 1, illustrating details of the container;

FIGURE 3 is a cross-sectional view taken on line 3—3 of FIGURE 1 illustrating how the mobile substance is supplied to the rotating assembly;

FIGURE 4 is an exploded view of the clamping ring forming a part of the mechanism of FIGURE 1;

FIGURE 5 is an elevational view of a large crankshaft illustrating the use of the invention of the dynamic balancing thereof;

FIGURE 6 is a cross-sectional view taken on line 6—6 of FIGURE 5;

FIGURE 7 illustrates an alternative form of the container which is shown partially in cross section;

FIGURE 8 is another view of the alternative form of the container;

FIGURE 9 is a cross-sectional view taken on line 9—9 of FIGURE 8; and

FIGURE 10 is an exploded view of the visible index shown in FIGURE 8.

Reference is now made to FIGURES 1-4 which illustrate the balancing mechanism of the present invention as well as the mode of use thereof. A rotatable body B adapted to rotate about an axis C is assumed to be dynamically unbalanced. An assembly D provided by the present invention is removably clamped around body B to rotate concentrically therewith, assembly D including amongst other features thereof a normally empty container D-5 for receiving controlled quantities of a mobile substance from an external source. Body B is supported from a stationary supporting structure not illustrated in the referenced figures of the drawings. A source E for supplying mobile substance to container D-5 is completely disassociated both from body B and from assembly D, and is supported in a stationary position. A connecting tube F provides a means for conveying the mobile substance in controlled quantities from source E to assembly D, where it reaches container D-5 in a manner which will be explained.

Assembly D includes a clamping ring D-1 having a circular trough, groove or fluid receptacle D-2 provided on the inner circumferential surface thereof adjacent a circumferential access opening D-3. A counterweight D-4 rigidly mounted on one side of the clamping ring compensates for the weight of the normally empty container D-5 which is rigidly supported in a radially outward position from the other side of the clamping ring. The inner end of container D-5 furthest from body B is positioned at a fixed radius distance D-6 from axis of rotation C. A tube D-7 rigidly supports container D-5 in fluid communication with trough or receptacle D-2 and extends approximately half the internal length of container D-5 in order to inhibit the reverse flow of a fluid or other mobile substance from the container to the trough or receptacle. A drain plug D-8 provided on the outer end of container D-5 permits the accumulated fluid or other mobile substance contained therein to be drained therefrom into a separate weighing chamber, not shown.

Clamping ring D-1 includes a pair of substantially semi-circular sections 10, 11 which have protruding flange portions 10a, 10b and 11a, 11b provided on the extremities thereof. The flange portions project radially from the center of the ring and are disposed in mating relationship, each being also provided with a circular bore such that flanges 10a, 11a may be rigidly fastened together by a bolt 12 and flanges 10b, 11b may be fastened together by a bolt 13. Referring specifically to FIGURE 3 which illustrates a cross-section of ring portion 10 it will be noted that the ring consists of an elongated substantially rectangular member suitably modified to provide access opening D-3 and groove or trough D-2. More specifically, the cross section of member 10 has a flat horizontal bottom surface 15 and a flat vertically extending right-hand edge surface 16. A flat horizontal top surface 17 extends leftward from the upper end of side surface 16, but only for about five-eighths of the distance corresponding to the width of bottom surface 15. Upper surface 17 is in frictional engagement with the bottom surface of body B. Member D has a left-hand edge surface 18 which extends upward from the left end of bottom surface 15 but only for about two-thirds the height of right-hand edge surface 16. A slanted inner surface 19 extends downward and to the right from the upper end of left-hand side surface 18, at approximately a forty-five degree angle from the horizontal as well as from the vertical. A vertical surface 20 extends downward from the left-hand edge of top surface 17 and together with surface 19 forms a vertex which provides groove or trough D-2. As shown in FIGURE 3 tube F extends over left-hand wall 18 and over a portion of inner slanted surface 19 so as to discharge fluid or other mobile substance by force of gravity into groove or trough D-2 at the under side of body B.

Ring section 11 is provided with a threaded bore 22 in the mid-portion thereof which is adapted to receive a radially disposed threaded shaft 23 upon the outer end of which counterweight D-4 is suspended. The threaded outer end portion of the shaft, together with suitable lock nuts, permits the position of the counterweight to be adjusted radially so as to provide dynamic balance of the entire assembly D including the empty container.

Container D-5 is in the form of a hollow cylinder with closed ends each having a central opening. Ring portion 10 has a threaded bore 25 at the mid-portion thereof which is positioned exactly one hundred eighty degrees away from threaded bore 22, and is adapted to receive a threaded end of pipe section D-7 so as to provide fluid communication from the lowermost part of groove or trough D-2 into the pipe. Pipe section D-7 extends through the opening in one end of container D-5 and is rigidly fastened thereto, as for example, by welding around the outer surface of both pipe and container. Pipe D-7 extends inwardly of the container about half the length thereof to provide a trap for the fluid or other mobile substance, that is, the substance when received in the container cannot flow back to groove or trough D-2 when the rotation of body B is slowed or stopped.

Ring portion 10 is provided with suitable gaskets 10c, 10d which are provided on the upwardly disposed surfaces of flange portions 10a, 10b, respectively, and secured in appropriate grooves in the flange surfaces. The gaskets ensure that groove or trough D-2 provides a fluid-tight receptacle so that the mercury or other mobile substance will not be lost therefrom by seeping between the flange portions of the clamping ring assembly.

The manner of usage of the invention is quite simple. Body B is first rotated and tested with conventional equipment to determine the angular position of its excess mass concentration. Upon completion of that test run the rotation of the body is stopped, the heavy mass position is visibly marked thereon by chalk or other convenient means, and assembly D provided by the present invention is then removably clamped around body B. Assembly D is clamped in such a position that empty container D–5 is one hundred eighty degrees removed from the center of excess mass concentration. Source E and tube F are then set up in a suitable stationary position relative to assembly D so that the end of the tube projects through access opening D–3 for delivering the mobile substance into trough D–2. It will be noted that source E and tube F comprise basically a funnel arrangement having an elongated spout which is suitably bent to serve the purpose at hand. When the set-up is completed, rotation of body B is again commenced and the operator continuously observes the conventional indicating equipment so as to determine when the unbalance has been successfully compensated. Incremental quantities of mobile substances are supplied to trough D–2 and thence to container D–5, for example, the operator simply pours small quantities of mercury into the funnel from time to time in order to slowly increase the amount of compensating weight contained in container D–5. The mercury or other mobile substance will be retained in trough D–2 by virtue of the centrifugal force produced by the rotation of body B and assembly D. When dynamic balance is achieved as indicated by the auxiliary equipment the operator does not add any more mercury to the container, and stops the rotation of body B. Thereafter drain plug D–8 is removed and the mercury or other mobile substance is drained from container D–5 and weighed.

It is preferred to establish the value of radius distance D–6 to correspond with a convenient radius distance at which material may be added to or removed from body B in order to accomplish the desired compensation. This will be more clearly illustrated from the following description of the use of my invention in dynamically balancing a large crankshaft, for which reference is now made to FIGURES 5 and 6.

FIGURE 5 illustrates a rigid frame structure G upon which a crankshaft H is horizontally suspended to rotate about its longitudinal axis. Electrical detection apparatus J housed in a separate structure adjacent frame G is utilized in conjunction with various instruments, not shown, for measuring and indicating the vibration of a movable cradle K which is suspended from frame G.

Crankshaft H includes a number of separate journals including a main journal 31 at its left end, a main journal 37 in its approximate center, and a main journal 43 at its right end, upon each of which balancing is to be performed in accordance with the invention. Crankshaft H is supported upon movable cradle K by rollers upon which the other main journals of the crankshaft ride, and by suitable supports at each end of the crankshaft, all of which are conventional and need not be described here. Unbalance of the crankshaft at a particular point along its length will, in general, induce amplified mechanical vibrations in the associated portion of the movable cradle K and these vibrations will, in turn, be detected and indicated by apparatus J together with its associated instrumentation.

Crankshaft H includes a number of main journals, a number of pin journals and a number of counterweights which are interspersed throughout its length. For example, a counterweight 45 is positioned immediately adjacent main journal 43, and a counterweight 46 is midway between journals 37, 43. In providing the necessary weight compensation to achieve dynamic balancing of the crankshaft it is convenient to utilize a movable drill 47 which is mounted upon the top of frame structure G and which can traverse from one end of the crankshaft to the other. Rather than adding weight to the crankshaft at any specified point or points it is more convenient to drill holes in one or more of the counterweights for the purpose of removing weight. Assuming that balancing at main journal 43 requires weight to be removed from the surface of adjacent counterweight 45, it then becomes convenient to establish the value of fixed radius D–6 to coincide with the radius distance of the counterweight surface from the axis of rotation. This relationship is clearly illustrated in FIGURE 6, where the clamping assembly has been inverted relative to the counterweight to show the comparison.

Of course it is true that when the quantity of mercury or other mobile substance supplied to container D–5 becomes substantial the distance D–6 no longer represents the average radius arm at which this added mass is rotated. It is also true, however, that when a hole is drilled in the surface of one of the counterweights the average radius distance of the removed material is somewhat less than the radius distance to the counterweight surface. These two discrepancies or errors are in the same direction and can conveniently be made to cancel each other. This can be done by establishing the inner diameter of container D–5 to coincide with the diameter of the drill holes, except to the extent that suitable allowance is made for the difference in density between the mercury or other mobile substance and the metal to be drilled from the drill holes.

Reference is now made to FIGURES 7–10 illustrating a further refinement of my invention. Rather than weigh the amount of mercury or other mobile substance added to container D–5, and thereafter weigh the chips of metal which are drilled out to provide the needed correction, it is in some cases far simpler to rely on distance measurements only. If the diameter of the drill and of container D–5 are adjusted to provide the same weight of material per unit of length, then the radius distance problem is overcome. At the same time it becomes possible simply to measure the depth of the mercury or other mobile substance, and to measure the depth of the drill hole, without actually weighing the materials involved. The above is true provided that distance D–6 corresponds to the radius distance for the surface of the counterweight which is to be drilled.

FIGURES 7–10 illustrate a modified form of the container in which visible index means are provided for indicating the amount of mercury or other mobile substance contained therein. As shown in FIGURE 7 a cylindrical plastic liner 55 lines the inner wall of the container. As shown in FIGURE 8 a visible index 56 extends from the outer end of container D–5 (adjacent plug D–8) radially inward toward the rotation axis. As shown in FIGURE 9 a recess 57 provided in the outer wall of the container permits portion 56 of plastic liner 55 to be visible from the exterior of the container. Index portion 56 shown in expanded form in FIGURE 10 has suitable scale markings thereon to indicate the depth of mercury or other material in the container.

While a particular form of my invention has been illustrated it is apparent that many other forms are possible. For example, it is not necessary to utilize a counterweight such as D–4 since some equivalent means of dynamically balancing the empty container D–5 may be used. It is also not entirely necessary to use trough or groove D–2 with its associated access opening D–3, since the purpose of the invention is to add weight in controlled amounts to the container D–5, and this purpose can be accomplished by more direct means. In some applications of the invention it will be convenient to use shot or other small metal particles in lieu of mercury. The essence of the invention is that a normally empty container together with a suitable supporting assembly comprising a dynamically balanced unit are removably clamped around the rotatable body to be balanced, and compensating weight is added to the container by supplying controlled quantities of a mobile substance from a source which is disassociated both from the rotatable

I claim:

1. Balancing apparatus for dynamically balancing a crankshaft having a plurality of main journals, a plurality of pin journals, and a plurality of counterweights all spaced along the length thereof in interspersed configuration, said apparatus comprising: a rigid ring adapted to be removably mounted on one of said main journals to rotate concentrically therewith, one side of said ring having an access opening therein extending continuously around the entire inner circumference thereof, the interior portion of said ring having an annular trough formed therein extending radially outwardly from said inner circumference and in communication with said access opening and extending continuously around the entire inner circumference of said ring; a container rigidly mounted upon said ring in a radially outward position from said trough in fluid communication therewith, the outer end of said container being the same radius distance from the longitudinal axis of the crankshaft as the outer surface of an adjacent counterweight from which material may be removed to compensate for any dynamic unbalance, said ring and said container being normally dynamically balanced as an integral unit; and tube means operable while said ring is rotating for feeding mercury in desired quantities via said access opening into said trough and thence into said container to determine the amount of weight compensation required in order to eliminate any dynamic unbalance exhibited by the crankshaft at said main journal location.

2. Balancing apparatus for dynamically balancing an elongate workpiece, having at least one main journal, about the longitudinal axis of said workpiece, said workpiece being dynamically unbalanced along a known radial line, said apparatus comprising: a rigid ring shaped member adapted to be removably mounted on said main journal with the axis of said ring member coincident with said longitudinal axis of said workpiece, said ring member being of substantially rectangular radial cross section having an inner and outer diameter and first and second opposed side walls, said inner diameter being greater than the diameter of said journal; an annular trough extending radially outward from said inner diameter between said side walls and to a first predetermined constant radius, said annular trough having a wall thereof extending from said first radius inwardly and to one of said side walls at a second constant radius less than said first radius to define an annular access opening in said one side wall to said trough, said access opening extending from said inner circumference to said second radius at said one side wall; a fluid-tight container affixed to said ring member and extending radially outwardly therefrom along said known radial line of unbalance, said container being in fluid communication with said trough, a weight affixed to said ring member at the diametrically opposed position on said radial line with respect to said container, said ring member, weight and container being dynamically balanced about the axis of said ring member; a stationary source of mercury positioned remote from said ring; and a fluid conducting tube means extending from said source to said access opening, which tube means is operable while said ring is rotating for feeding mercury in desired quantities through said access opening into said trough and thence into said container to determine the amount of weight compensation required along said radial line in order to eliminate said dynamic unbalance at said journal.

3. Apparatus as claimed in claim 2 in which said container is provided with means for preventing said mercury from flowing back into said trough when the rotation of said ring is stopped, and is further provided with means operable after the rotation of said ring has stopped for draining all of said mercury therefrom into a separate weighing chamber.

4. Apparatus as claimed in claim 2 in which said container is further provided with visible index means for indicating the amount of mercury contained therein.

5. Balancing apparatus for dynamically balancing a crankshaft having at least one main journal and from which material is to be removed to compensate for any dynamic unbalance, and a counterweight adjacent said journal and having an outer surface located a predetermined distance from the longitudinal axis of said crankshaft, said apparatus comprising: a rigid ring adapted to be removably mounted on said main journal in frictional contact therewith to rotate with said journal, one side wall of said ring having an access opening therein extending continuously therearound, the interior portion of said ring having an annular trough formed therein in fluid communication with said access opening; a container rigidly mounted upon said ring in a radially outward position relative to said trough and in communication therewith, with the outer end of said container being said predetermined distance from the axis of rotation, said ring and said container being normally dynamically balanced as an integral unit; and tube means being operable while said ring is rotating for feeding mercury in desired quantities via said access opening into said trough and thence into said container to determine the amount of weight compensation required in order to eliminate any dynamic unbalance exhibited by the crankshaft at said main journal location.

6. Apparatus as claimed in claim 5 in which said container is provided with means for preventing said mercury from flowing back into said trough when the rotation of said ring is stopped and is further provided with means operable after the rotation of said ring has stopped for draining all of said mercury therefrom into a separate weighing chamber.

7. Apparatus as claimed in claim 5 in which said container is provided with means for preventing said mercury from flowing back into said trough when the rotation of said ring is stopped, and is further provided with visible index means for indicating the amount of mercury contained therein.

References Cited in the file of this patent

UNITED STATES PATENTS

| | | |
|---|---|---|
| 1,159,052 | Le Blanc | Nov. 2, 1915 |
| 1,243,345 | Rodgers | Oct. 16, 1917 |
| 1,554,014 | MacFarland | Sept. 15, 1925 |
| 1,610,487 | Brinton | Dec. 14, 1926 |
| 2,046,294 | Lundgren | June 30, 1936 |
| 2,534,267 | Kahn | Dec. 19, 1950 |